United States Patent [19]

Fortin et al.

[11] Patent Number: 5,798,875
[45] Date of Patent: Aug. 25, 1998

[54] APPARATUS FOR DITHERING

[75] Inventors: Jean Fortin, Ste-Foy; Paul Chevrette, Quebec, both of Canada

[73] Assignee: Her Majesty the Queen in right of Canada, as represented by the Minister of National Defence, Ottawa, Canada

[21] Appl. No.: 566,441

[22] Filed: Nov. 30, 1995

[30] Foreign Application Priority Data

Mar. 13, 1995 [CA] Canada ................... 2144482

[51] Int. Cl.⁶ ........................ G02B 7/02
[52] U.S. Cl. ............. 359/813; 359/822; 358/474
[58] Field of Search ............... 359/813, 814, 359/819, 822, 824; 358/474

[56] References Cited

U.S. PATENT DOCUMENTS

| | | | |
|---|---|---|---|
| 3,620,603 | 11/1971 | White | 359/813 |
| 3,989,358 | 11/1976 | Melmoth | 359/813 |
| 4,633,317 | 12/1986 | Uwira | 348/219 |
| 5,189,294 | 2/1993 | Jackson et al. | 250/201.9 |
| 5,291,327 | 3/1994 | McEwan | 359/209 |
| 5,301,042 | 4/1994 | Blanding | 358/474 |
| 5,335,091 | 8/1994 | Palum | 358/474 |
| 5,526,192 | 6/1996 | Imura et al. | 359/813 |

OTHER PUBLICATIONS

Sampling Effects in CdHgTe focal plane arrays–practical results; R.J. Dann, S.R. Carpenter, C. Seamer. Marconi Command and Control Systems Limited, Frimley, Carberley, Surrey, U.K. SPIE Vo. 685 Infrard Technology XII (1986) pp. 123–127.

Primary Examiner—Loha Ben
Attorney, Agent, or Firm—Neil Teitelbaum & Associates

[57] ABSTRACT

An dithering system for implementation of a microscan that dithers an image on an array of sensing elements that defines an image plane by moving one or more lenses which displaces the image focused on the image plane. Piezoelectric positioners are provided to move the one or more lenses a predetermined amount and on a predetermined plane parallel to the image plane so that the image focused by the lensing system on the array of sensing elements is displaced on the image plane by the movement of the lensing system. As the lens is moved by the positioners and thus the optical axis of the lens, the image passing through the lens is also moved on the image plane. Moving the lens horizontally and vertically or in a predetermined pattern provides dithering of the image so that microscanning can be employed.

11 Claims, 9 Drawing Sheets

APPARATUS FOR DITHERING

FIELD OF THE INVENTION

This invention relates to an apparatus for controlled dithering of a projected image, such as one projected on a focal plane array (FPA), and in particular but not exclusively to such imagers imaging in the infrared (IR) wavebands.

BACKGROUND OF THE INVENTION

IR imaging systems are becoming more important in many fields, particularly in military, security and search and rescue applications. Early IR imagers employed a small number of detector elements, across which was scanned an IR image of the scene via a system of mirrors. More recent developments include imagers based on 2 dimensional arrays of detector elements, so called staring arrays, which require no scanning to produce a useful image of the scene. The dwell time available for each detector element in such systems is increased considerably over earlier scanner systems resulting in significantly improved system performance being achievable from comparable detector materials. An IR system designer can choose whether to exploit this increase in performance or use a lower performance detector material to achieve a similar sensitivity as in the earlier scanner systems. High system performance is typified by imagers based on arrays of Cadmium Mercury Telluride cooled to liquid nitrogen temperatures, whilst conventional levels of performance are achieved by imagers based on Schottky barrier arrays and pyroelectric ceramics. These latter systems offer significant advantages in terms of cost and or logistical support requirements (such as coolant supplies) over the high performance systems.

Unfortunately, several disadvantages of FPA imagers must be overcome to provide performance comparable with conventionally scanned imagers. Current FPAs are only available in limited pixel counts, typically 128×128, 256× 256 or 512×512 elements, which is insufficient to match the spatial resolution of the best scanned imager systems. Eventually, the development of suitable fabrication technologies will overcome this problem, resulting in large pixel densities.

Electronic imaging systems employing solid state image sensors or charge coupled device (CCD) arrays are used to produce standard video resolution (512×512 pixel) as well as higher resolution images. Image sensors are utilized in television cameras and other electro-optic systems to convert a visual presentation on the sensor's surface into a serial pulse train of electrical signals. The pulse train is then processed and conditioned for whatever purpose is to be made of information contained therein. When the CCD is used for image reproduction as part of an electro-optical depiction system it is placed in the focal plane of an optic system comprised of lenses, collimators, etc. Multiplexors associated with the component CCDs convert the image sensed in a focal plane to a train of pulses, the amplitude of which is directly proportional to the intensity of illumination occurring at each photo site or pixel of the sensors.

Silver halide photographic images can be captured with an acceptable loss in resolution if an array with at least 2000×3000 pixels is used. A 4000×6000 pixel array is probably closer to optimum. At present, the largest arrays contain about four million pixels in a 2000×2000 array. At this density the arrays are very expensive and still do not produce images with silver halide photographic resolution. If the number of pixels is simply increased in a CCD to satisfy the need for high integration, the chip size will be increased. If the number of pixels is increased and their size decreased in order to increase the number of pixels without changing the chip size, the integration of pixels must be greatly enhanced. In this case it is technically difficult to prepare the high density CCD and even if fabrication techniques allow the manufacture of such a CCD, the circuit configuration becomes complicated and the power consumption becomes high, giving rise to new problems.

Figure 1A:
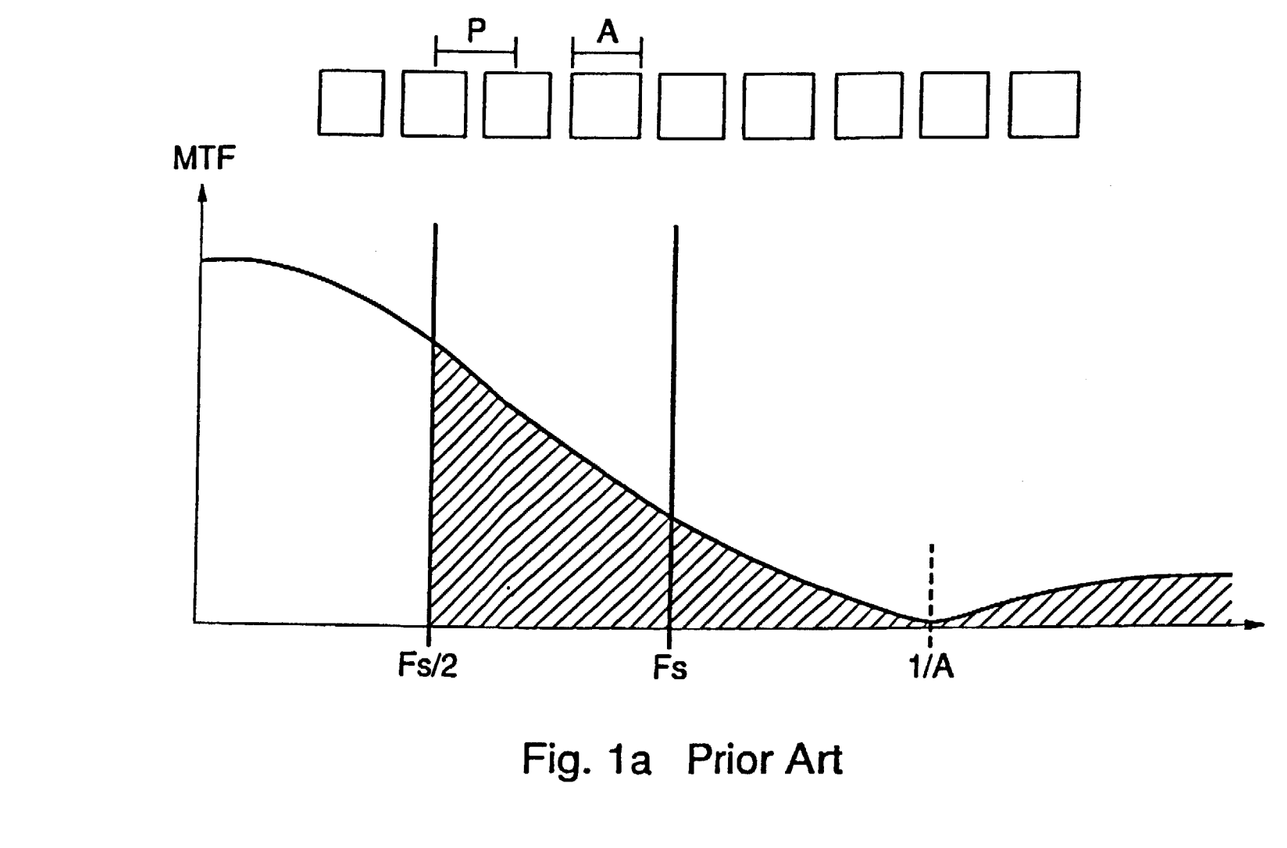
FIG. 1a is a graph depicting modular transfer frequency (MTF) versus spatial frequency ($F_s$)

A fundamental problem, however, concerns the basic physics of imaging via a focal plane array. This is shown schematically in FIG. 1a, where a single row of elements from the detector array is considered. For simplicity the elements are considered square in shape, of length given by A, and are fabricated with a pitch P. The modulation transfer function (MTF) of a single element in the array is given by the modulus of the sinc function, as shown in the figure, with the first zero occurring at a spatial frequency of 1/A. Since an array of such elements is used, this MTF as shown in FIG. 1a is convolved with a series of delta-functions separated by spatial frequencies of Fs(=1/P), the sampling frequency. As shown in the figure, this results in a folding of the MTF curve into the area between 0 and Fs/2. Spatial frequencies higher than Fs/2 which are present in the image are reproduced by the array as lower, alias frequencies in the range 0 to Fs/2. For 2 dimensional arrays the effect is much worse than FIG. 1a shows, since aliasing occurs in both axes simultaneously. The effect is similar to conventional data sampling limitations, governed by Nyquist's Theorem, except that it occurs in the spatial domain rather than in the post detection electronics.

Figure 1B:
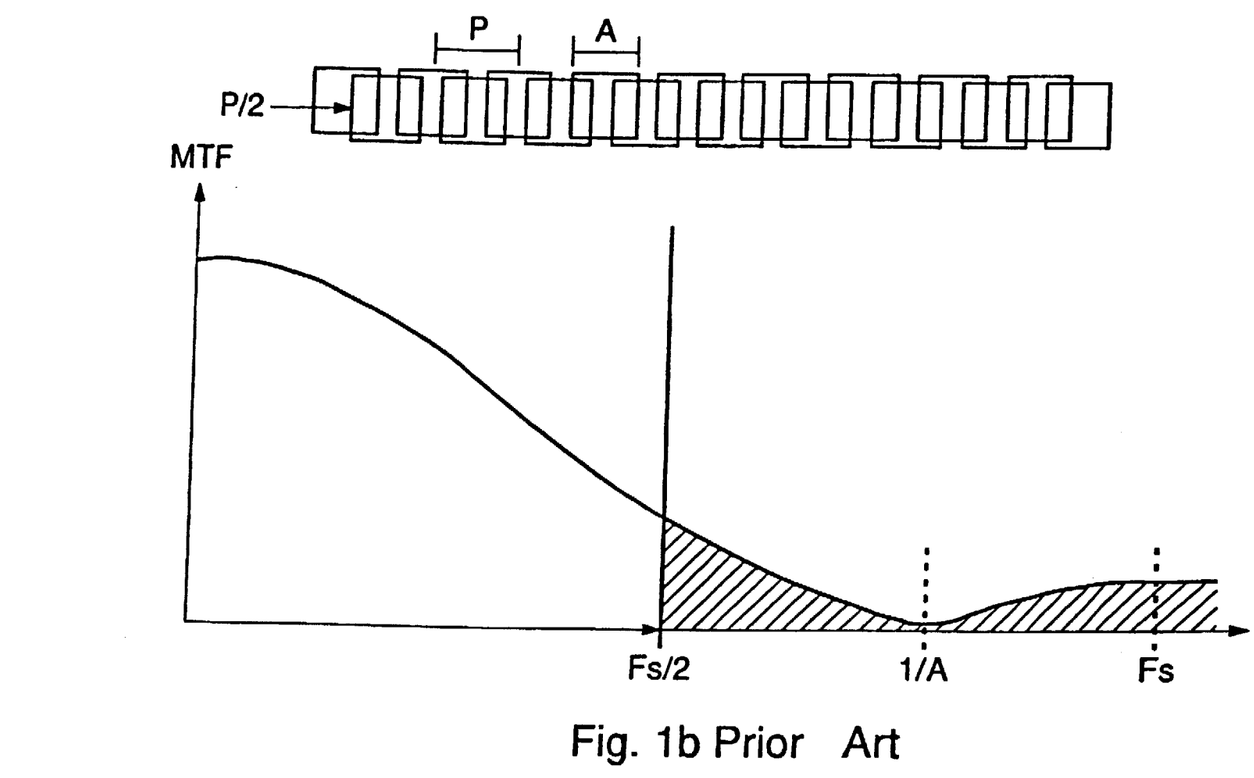
FIG. 1b is a graph similar to FIG. 1a in which the image is moved by ½P.

For staring systems, therefore, the MTF is limited by the inverse of twice the detector pitch, and the full MTF available from the detector geometry cannot be exploited as it would in a scanning system. One technique which has been widely used to overcome this limitation is termed dithering, or microscan, or mechanical interlace. In this technique, the image of the scene is dithered or moved across the detector array, when the device is not imaging, by a fraction of the inter-element pitch, such that an integral number of steps fit into the pitch. The display of the subsequent field of data is shifted by a corresponding amount to ensure the fidelity of the reconstructed image. The effect of dithering is shown in FIG. 1b, which considers a first order microscan, in which the image is moved by ½P. The MTF of the individual elements remain unchanged, however the sampling frequency is multiplied by the microscan factor, which in this case is 2. As a result a much larger portion of the MTF can be utilized before aliasing is encountered.

Dithering therefore permits the MTF of scanning systems to be achieved in staring systems. Different orders of dithering are frequently adopted, such as 2×2 or 3×3, the numbers representing the number of steps in each axis per pixel pitch. The optimum choice of microscan order depends on the relative size of the element and sampling pitch and the effect of other factors such as the optical MTF.

Microscanning, or dithering has been achieved by a variety of mechanical/optical dithering devices; for example, in U.S. Pat. No. 5,335,091 in the name of Palum, issued Aug. 2, 1994, several U.S. patents related to dithering are described.

For example, U.S. Pat. No. 4,517,603 (Epsztein and Guyot) discloses a device for producing televised pictures with a high degree of resolution. The device comprises a photosensitive matrix which receives an optical image and an electromechanical apparatus for displacing the matrix with respect to the image. The displacement is equal to half the size of the pixel. In the construction of the device, the photosensitive matrix is surrounded by a mechanical support guided by members which also act as end of travel stops for limiting the total displacement of the matrix to a half line. The support is subject to a restoring force supplied by springs whose rigidity must be such that the matrix displacement takes place in less than about 2 microseconds. The support is subject to an exciting force supplied by a moving coil immersed in a radial magnetic field and controlled by a square signal generator.

U.S. Pat. No. 4,554,586 (Tanuma et al.) discloses a solid state image sensing device which includes a base board fitted with a CCD serving as an area sensor and a pair of bimorph piezoelectric vibrating elements which jointly vibrate the CCD relative to an incoming image in a plane substantially parallel with the surface of the base board. The piezoelectric vibrating elements are elastically held above the base board by supporting plates having a spring action.

U.S. Pat. No. 4,581,649 (Morokawa) discloses a pickup system which has an image sensor including a plurality of photodetectors arranged in two dimensions and an optical system having a lens for forming an image on the image sensor. A vibrator is provided for vibrating the image on the image sensor so as to oscillate the picture data and a scanner is provided to be operative in synchrony with the vibration of the image to change the oscillated picture data to data for a fixed image. The vibrator comprises a pair of piezoelectric vibrator elements disposed on both sides of the support plate which is supported on a support. A counterbalance is secured to an electrode of the vibrator element so that when both vibrator elements are driven by a signal from a driving signal source, the image sensor and balance are reciprocated and the vibration of the system is canceled.

U.S. Pat. No. 4,607,287 (Endo et al.) discloses a solid-state image sensing device in which a CCD is coupled to fixed bimorph piezoelectric vibrators by which it is given a wobbling-swing drive during image pickup. This wobbling-swing drive is controlled by a controller which provides two vibrations: a swing vibration and a wobble vibration superimposed on the swing vibration so that the pickup operation is performed at each sampling position while wobbling when each pixel is positioned in each field.

U.S. Pat. No. 4,633,317 (Uwira et al.) discloses a high resolution electro-optical detector system incorporating a mosaic CCD. The image of the field is periodically displaced along a closed trajectory to cover the interstices between the detector elements of the mosaic detector. The image is moved relative to a stationary mosaic detector. Each image element performs a movement clockwise along a closed circular trajectory. The image is rotated by means of a plane mirror which is supported on three piezo elements. The mirror carries out a uniform rotating motion when three alternating voltages mutually displaced in phase by 120 degrees are supplied to the three piezo elements which are angularly spaced by 120 degrees. Uwira et al also disclose the use of a wedge shaped optical element arranged to rotate in the path of the system effecting a gyrating image offset. Unfortunately this system has been known to have serious drawbacks. Uwrira's wedge is in effect a prism and suffers from chromatic aberration, wherein the wavelengths light passing through the wedge are separated into their respective colours.

U.S. Pat. No. 4,652,928 (Endo et al.) discloses a solid state image sensing system which includes a CCD and a vibration table. The vibration table moves the CCD in such a manner that it is vibrated in a horizontal direction in one vibration cycle consisting of two succeeding frame periods each having two fields. The CCD is fixed to the rear side of a vibration table opposite its image pickup side which faces a lens. The table comprises a bimorph piezoelectric element and vibrates in a cycle of two frame periods under a predetermined complicated vibration mode in response to a swing drive signal.

U.S. Pat. No. 4,755,876 (Dangler) discloses an image scanner which utilizes a dither plate to steer an image onto a sparsely-populated image sensor. A DC motor, which is responsive to a servo control is used to position the dither plate relative to the sensor. The position of the dither plate is sensed by a linear proximity sensor which is part of a closed-loop servo control for the motor.

U.S. Pat. No. 4,947,239 (Kondou and Ono) discloses a swing-driven solid state imagine device which has a CCD image sensor, a stacking piezoelectric element and a package structure. The piezoelectric element serves as an actuator for vibrating the image sensor in a plane substantially perpendicular to the image.

In many of these prior art devices the image sensor is physically moved from one position to another; this is often not desirable as the sensor is usually enclosed in a heavier piece of the imaging system. Magnetic displacement of the CCD platform (Epsztein) using a platform with a small spring constant leads to overshoot and oscillation after displacement. A wedged rotating plate with servo motor control (Dangler) has also been used but this technique is expensive to implement.

Figure 1C:
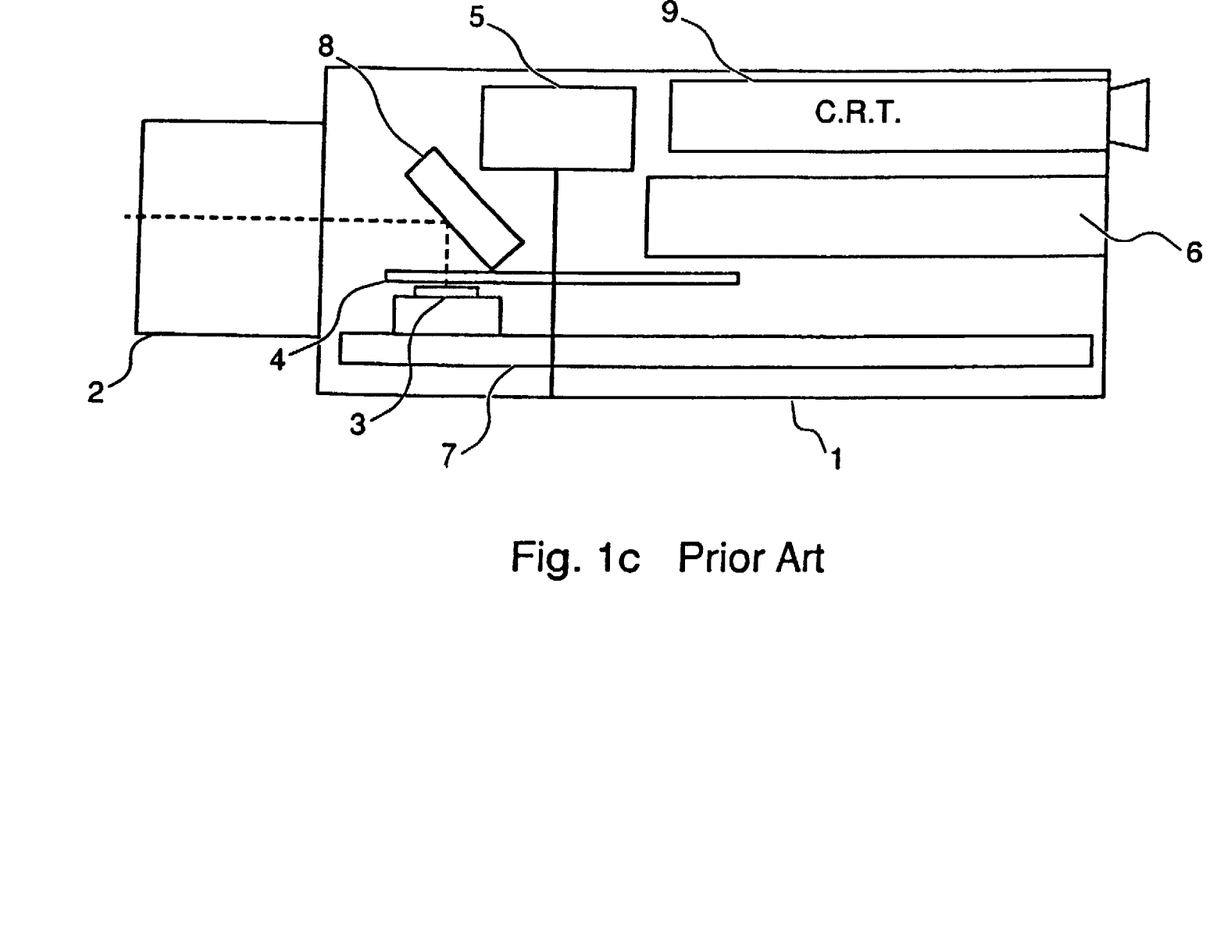
FIG. 1c is a schematic of a typical imager.

FIG. 1c shows a typical imager 1 for implementation of microscan. The imager 1 comprises a lens 2 focusing radiation on to an imagine array of thermal detectors 3. Such detectors require the radiation incident on them to be modulated by a chopper 4, driven by motor 5 energized by battery 6, in order for the detection process to work. A leading edge of the chopper 4 scans across the array 3 synchronously with readout from the array by the electronic circuit 7. Radiation from the scene is incident on the detector via a mirror 8. Microscan is achieved by tilting the mirror 8 while the entire detector is covered by the chopper 4. The processed image is viewed on a CRT 9. This implementation has the following disadvantages:

1. The microscan mechanism can be quite complex, since the mirror is ideally required to tilt in two orthogonal axes at a relatively high speed;
2. For maximum efficiency, the detector would be operated in consecutive fields, with the gaps between the chopper blades being exactly the same size as the detector itself. This would result in the entire detector being closed to radiation only for an instant. For the microscan mirror to move without degrading the image quality, this must be extended to a finite period—a blanking period—which can be a significant portion of the active field period. As a result the efficiency of the system is reduced;
3. The requirement of a fold in the optical path, for the reflective microscan to operate, limits the lowest f-number which the lens can achieve without vignetting, typically to greater than f/2.8;
4. The backworking distance of the lens must be maximized to fit the optical fold in; and
5. The entire assembly is difficult and costly to manufacture, requiring precision design and fabrication due to the large number of components competing for space close to the focal plane.

As an alternative to the prior art devices briefly described heretofore, U.S. Pat. No. 5,291,327 (McEwen) discloses a microscanning imager that includes a member in the form of a wheel for interrupting radiation between a lens and an array of imaging element. The member has alternate refractive transmissive regions and non-transmissive regions. The transmissive regions refracting radiation transmitted through them. As the disc rotates across the array the image focused on it moves giving successive frames which are shifted relative to one another. The displacement of an image across the array of sensing elements is achieved by refracting the radiation prior to incidence upon the array. This eliminates the need for an optical fold required with previous mirror arrangements, thereby relaxing the backworking distance requirement of the primary optical component. Although this invention appears to perform its intended function, it is known to have serious limitations. For instance, the alternate refractive transmissive regions and non-transmissive regions within the wheel define a microscanning pattern that cannot be varied without replacing the wheel with a different one having refractive elements in another configuration, or by using a plurality of wheels. The microscanning pattern is dependent upon the configuration of the refractive elements within the wheel. Moreover, the size of the transmissive region and the speed of rotation limit the radiation integration time and the frame rate of the array.

There is thus a need for a robust mechanical system that is both precise and inexpensive.

It is an object of the present invention to provide an apparatus for dithering an image that overcomes at least some of the above problems.

It is a further object of the present invention to provide an inexpensive robust system for dithering or microscanning.

It is a further object of the invention to attempt to optimize the speed (step rate) of the dithering mechanism by minimizing its dimensions and mass.

SUMMARY OF THE INVENTION

In accordance with an aspect of the invention, there is provided, a dithering system comprising,
 a) a stationary frame; a movable lens mounted to the stationary frame;
 b) flexure means for normally securing and holding the lens within the stationary frame, said flexure means, for allowing the lens to move along at least one axis in the presence of force applied to the flexure means along the at least one axis; and,
 c) means for applying the force to the flexure means.

In accordance with an aspect of the invention, there is provided, a dithering system comprising, a stationary frame; a movable lens mounted within the stationary frame; flexure means for normally securing and holding the lens within the stationary frame in a fixed position, said flexure means, for allowing the lens to move along each of two orthogonal axes in the presence of force applied to the flexure means along each axis; and, means for applying the force to the flexure means.

In accordance with another aspect of the invention, there is provided, a positioning device comprising: a stationary frame; an optical element mounted to and movable within the stationary frame, said movement being confined to a plane; flexure means in an unflexed position for normally securing and holding the optical element within the stationary frame in a fixed position, said flexure means for allowing the optical element to move along at least one axis along the plane in the presence of an applied force; and, means for applying the force to the optical element.

In accordance with the invention, there is provided, a dithering system for positioning an optical element in a plurality of positions along two orthogonal axes defining a plane comprising: a stationary frame; a holder secured to the optical element and mounted to the stationary frame; means for normally securing and holding the holder within the stationary frame in a fixed position and for allowing the holder holding the optical element to move along each of two orthogonal axes in the presence of force applied to the holder; and, means for applying the force to the holder.

BRIEF DESCRIPTION OF THE DRAWINGS

Exemplary embodiments of the invention will now be described in conjunction with the accompanying FIGS. 3b to 3e in which.

DETAILED DESCRIPTION

Figure 2:
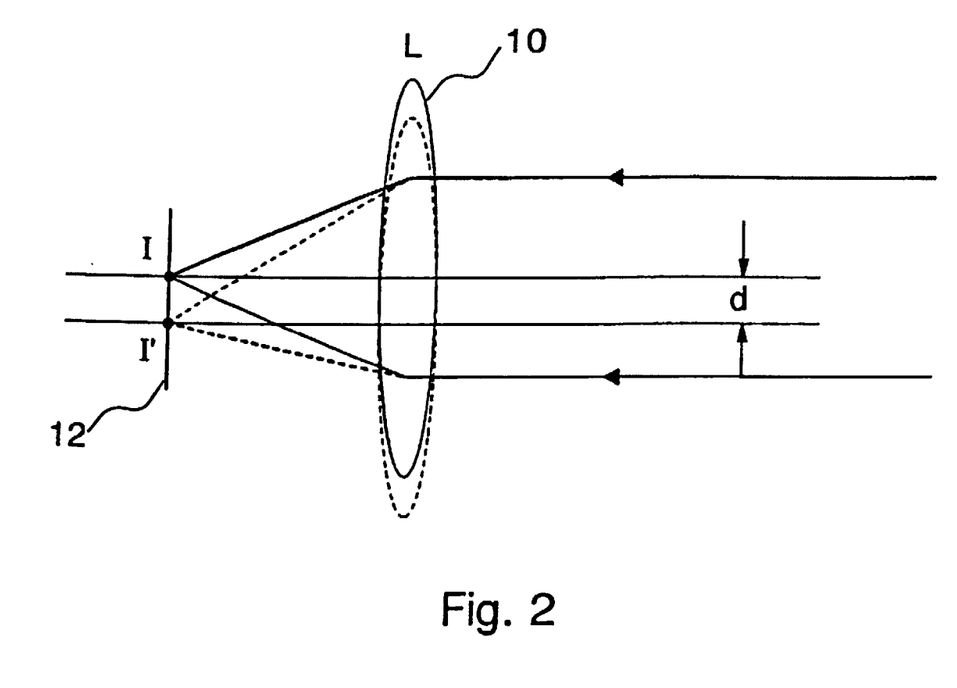
FIG. 2 is a side view of a lens adjacent an image plane illustrating the principles of the invention.

Referring now, to FIG. 2, a movable focusing lens 10 is shown spaced a predetermined distance from an image plane 12 of a detector array so that parallel light rays arriving at the lens 10 will be focused onto image plane 12 at a point I. This arrangement is illustrative of the principles of the invention; in a preferred embodiment, the lens 10 is replaced by a lens block comprising several lens elements coupled together to provide correction for optical aberration that is typically associated with a single lens system. In FIG. 2, a solid black line shows the lens 10 in a first position having a focal point I on the image plane; therefore an object at infinity is focused by the lens 10 onto the point I on the image plane. A dotted line shows the lens 10 in a second position having a focal point I'. Since the incoming light rays are parallel to the optical axis of the lens, the corresponding focal point also lies on the optical axis of the lens. As the lens 10 is displaced as by a distance d as shown by the dotted lines, the optical axis of the lens is also displaced by the distance d. Furthermore, the focal point and the image on image plane are both displaced by the distance d. Thus, displacing or offsetting the lens parallel to the image plane while maintaining its longitudinal distance from the image plane displaces the focal point on the image plane. Of course, the image can be displaced in any direction on the focal plane corresponding to the direction in which the lens is displaced.

Figure 1D:
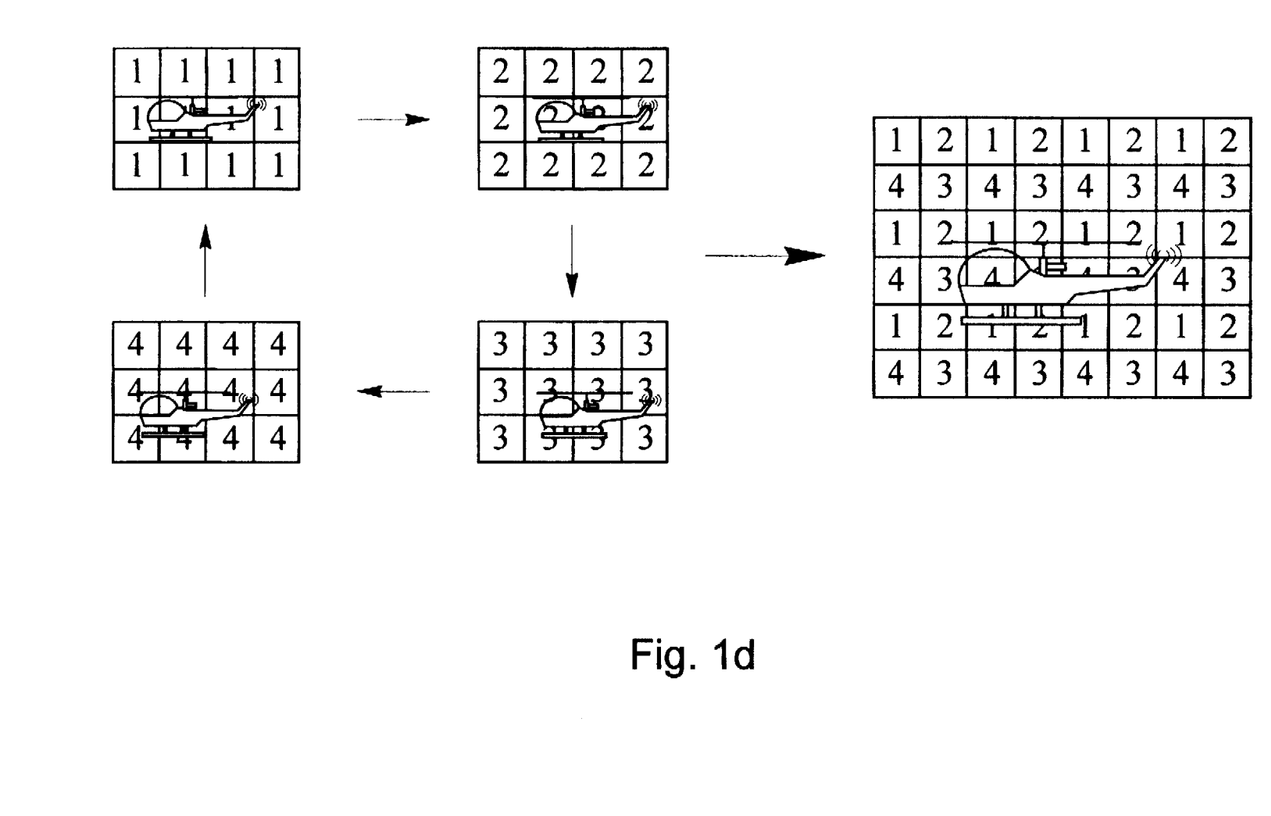
FIG. 1d is a pictorial diagram showing the steps required for a 2×2 microscanning operation.

Since microscanning is typically performed by moving an image on a detector mosaic or array, the image offset means in the form of the movable lens 10 described above, is arranged to produce a stepwise movement of the image along a closed trajectory as is shown in FIG. 1d. Referring now to FIG. 1d, a representation of the steps required for a 2×2 microscanning operation are shown. In the left part of the figure a first image is taken while keeping the image stable over the detector array for a duration suitable for integration. By moving the lens, the image is then moved to the right, as shown, by a half a pixel pitch distance and a second image is acquired. The image is then moved down for the third sample, and left to complete the cycle. The final microscanned image is then obtained from the four images previously acquired by interlacing all the pixels from all the images in both directions. This operation is shown in the right hand part of FIG. 1d.

Figure 3A:
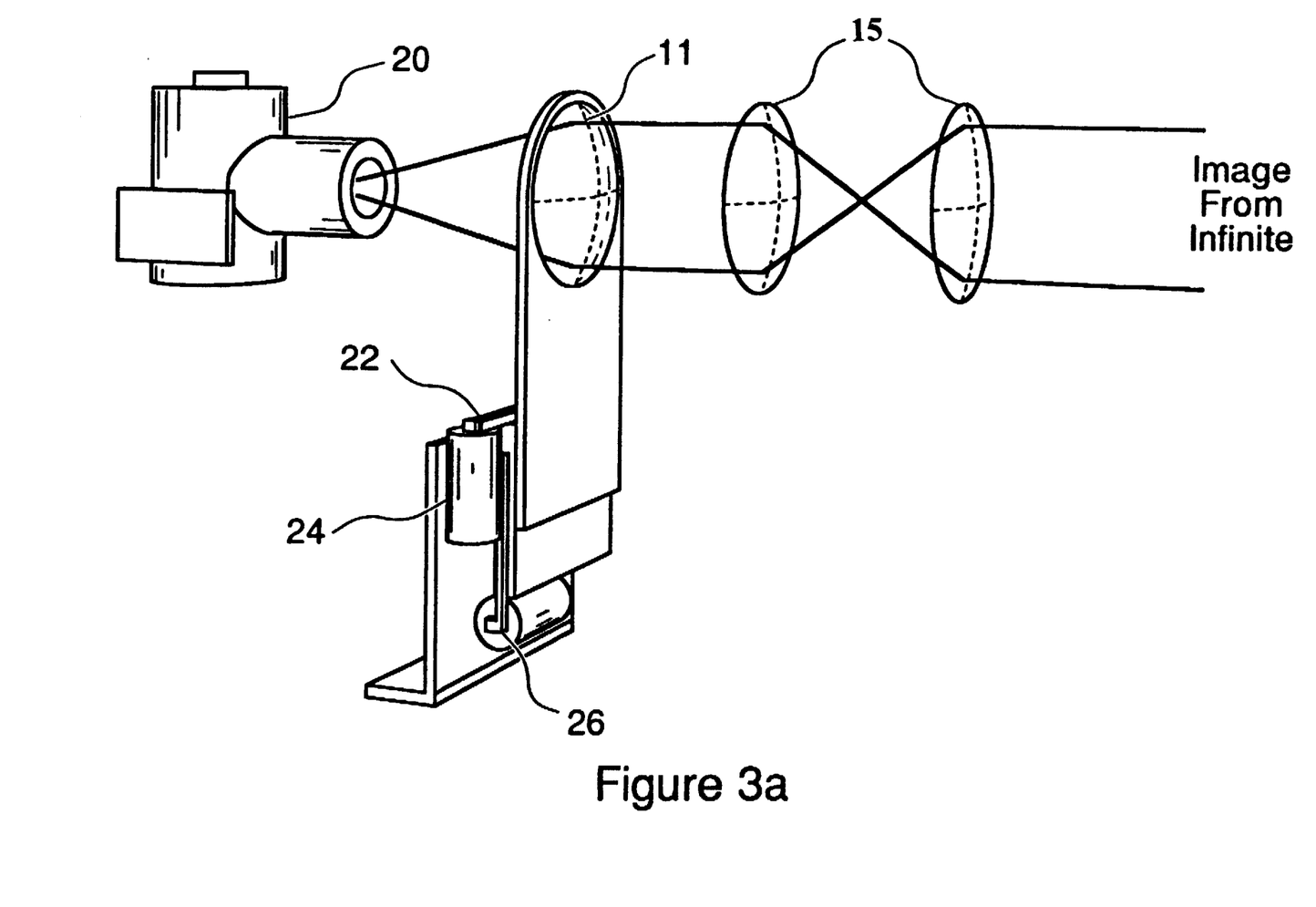
FIG. 3a is an oblique view of a microscanning system that uses the principles of this invention with a standard X-Y positioning translation table.

Referring now to FIG. 3a, a system is shown that includes an infrared detector array 20 positioned to receive an image from a microscanning lens 11 that focuses the image on the focal plane of the detector array 20. The system further includes a telescope 15 positioned to bring a distant image to the microscanning lens 11. The microscanning lens 11 is mounted on a two-axis translation table 22 and two piezoelectric positioners 24 and 26 control the position of the image on the detector array 20 by controlling the position of the lens 11. Standard X-Y positioners such as translation table 22 shown in the figure, normally use two single-axis sliding mechanisms, one for each axis. These sliding mechanisms allow the linear translation of one moving apart over a fixed part, by means of tracks and ball bearings. Springs or magnetic forces may be used to hold the fixed and moving parts together. When a two-axis movement is required, the fixed part of a second sliding mechanism is affixed to the mobile part of the first one, this first part then having to support the weight of the second sliding mechanism. One of the main disadvantages of such a scheme, apart from its mass, is its sensitivity to torque, particularly when the system is mounted to operate in a vertical plane. In this operating condition, because the two sliding mechanisms are stacked one on top of the other, the center of gravity of the second mechanism is offset with respect to the first one, creating a torque that may be deleterious to the movement of the first unit. Moreover, the weight of the second sliding mechanism is added to the moving part of the first one, thus creating an unbalance between the X and Y movements thus allowing coincidence of the centers of gravity of the moving and fixed sliding parts to bring an increase in weight because of the relative complexity in the translation mechanism requiring bearings and magnets to hold the parts together.

Generally, real-time operation requires all the dithering or microscanning steps to be completed within the time period of one frame at a standard frame rate of 30 frame/sec. Thus for a 4×4 (16 steps) microscan, the step rate must be of the order of 480 steps/s (~2 ms/step), with a positioning time short enough (<1 ms) to allow sufficient image integration during the period of each step. Of course, as the mass of the system increases, the task becomes increasingly more difficult to reach a step rate of 480 steps/s. Therefore, the mass of the lens, the lens holder and the translation mechanism must be kept to a minimum, yet allowing for reasonable dimensions and power consumption for the dithering mechanism and optical system.

The minimum response time of a device is determined by the inherent resonance frequency of the piezoelectric translators coupled to the translation table. The resonance frequency of the piezoelectric translator is in turn limited by the mass load to be displaced.

In contrast to the embodiment described above, in the instant invention depicted in FIGS. 3b to 3e, the moving part of the system holding the lenses is suspended in a position by means of wide flexible joints, which provide longitudinal rigidity in a plane containing the optical Z-axis, while maintaining a two-axis substantially friction-free movement in the perpendicular X-Y plane. Obviously, this scheme is valid for small displacements with respect to the length of the flexible joint. The telescope 15 placed in front of the microscanning lens is used to adjust the field of view. As was described above, a microscanning lens can comprise several lenses coupled together, however, in order to reduce the mass of the microscanning lens, it may be preferable to design the telescope to correct for and reduce optical aberrations within the system. In this manner, the system would allow faster image displacements and thus a higher image frame rate due to a microscanning lens 11 with less mass.

Figure 3B:
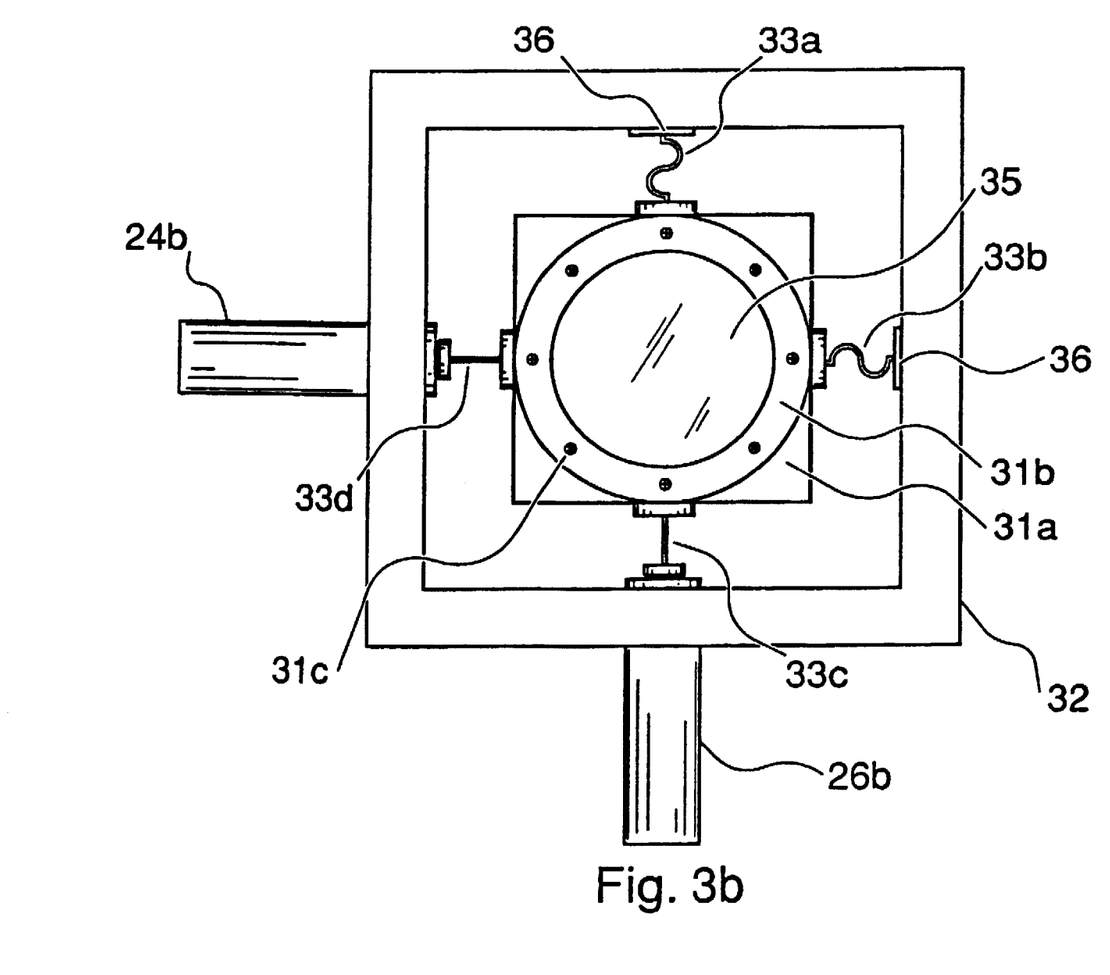
FIG. 3b is a plan view of a two-axis dithering system having a flexible joint coupling a lens to a lens holder.

Turning now to FIG. 3b, an embodiment of a microscanning lens holder in accordance with this invention is shown having a lens 35 held securely by a lens holder 31a. The lens holder 31a shown suspended within an outer frame 32 conveniently provides a means of supporting the lens 35 within outer frame 32. The lens holder 31a includes a pair of retaining rings 31b that surround the periphery of the lens without obstructing the working portion of the lens. The rings 31b are placed back to back (not seen in the view of the figure) with the lens 35 sandwiched in between; screws 31c tightly secure the lens 35 between the rings 31b. Two optional flexure means shown as spring joints 33a and 33b preferably in the form of S-shaped metal bands couple adjacent sides of the lens holder 31a to insides of outer frame 32 via coupling means 36. Two laterally flexible joints 33c and 33d in the form of longitudinal steel blades having coupling means 36 disposed at each end, couple two other adjacent sides of the lens holder 31a to piezoelectric positioners 24b and 26b fastened to the outer frame 32. This configuration allows the lens to be rigidly held within the outer frame 32, yet allows the lens to move in two directions along orthogonal axes, toward and away from the spring joints 33a and 33b as the piezoelectric positioners 24b and 26b move inward and outward. The lateral flexibility of steel blades 33c and 33d allow lateral movement when the other of the laterally flexible joints remains rigid and is moved by its respective piezoelectric positioner.

Figure 3C:
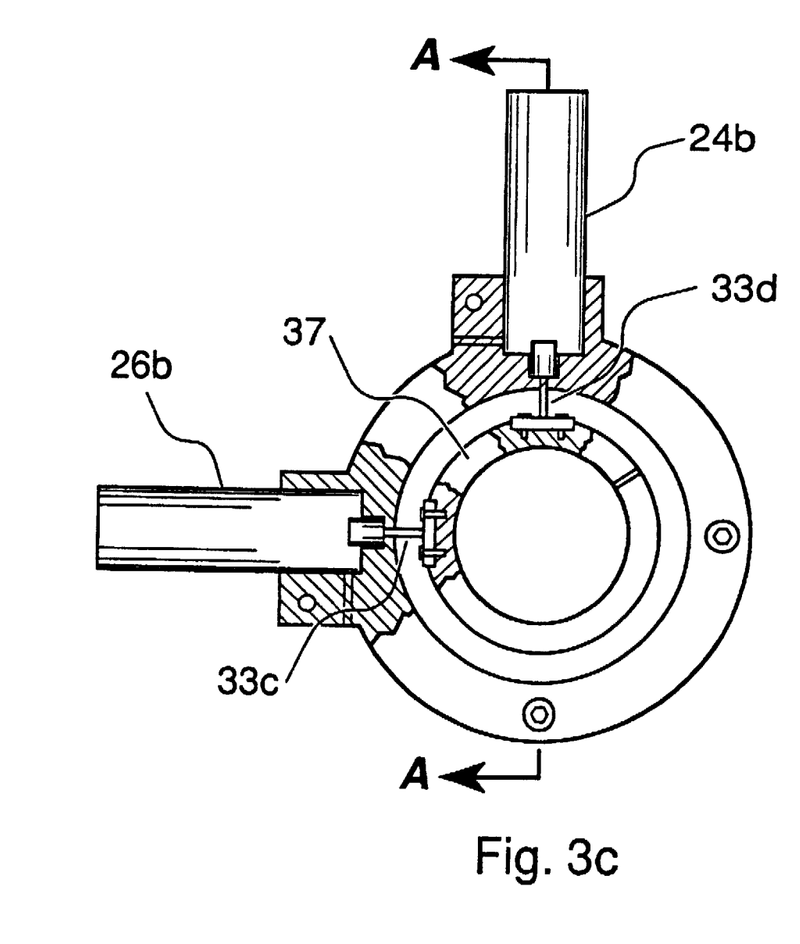
FIG. 3c is a partial section plan view of a similar but alternative embodiment of dithering system shown in FIG. 3b.
Figure 3D:
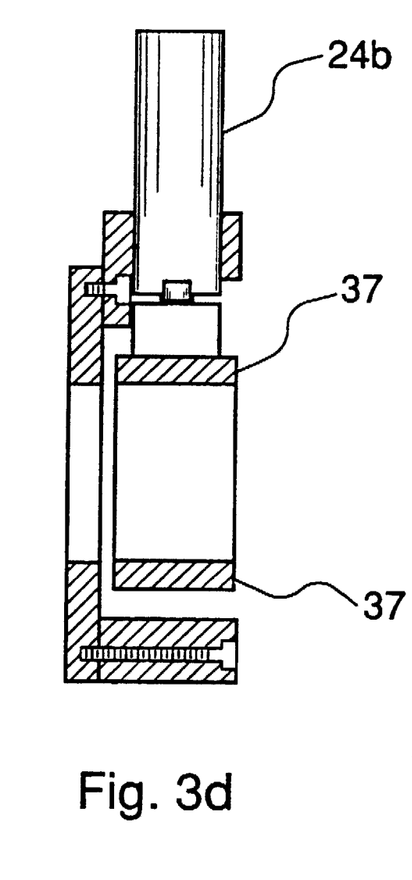
FIG. 3d is a partial-cross sectional view taken along line A—A of the dithering system shown in FIG. 3c; and, FIG. 3e is partial section plan view of another embodiment of the dithering system shown in FIG. 3c.

Referring now to FIG. 3c and 3d, an alternative embodiment of the invention is shown absent the spring joints 33a and 33b shown in FIG. 3b. By removing the spring joints and the load caused by the joints, the response time of the system improves. The trade-off in removing the joints 33a and 33b is some loss in longitudinal rigidity. A different form of lens holder 37 is shown in FIG. 3c wherein the holder is the form of a cylinder that houses multiple lenses having a same diameter.

Figure 3E:
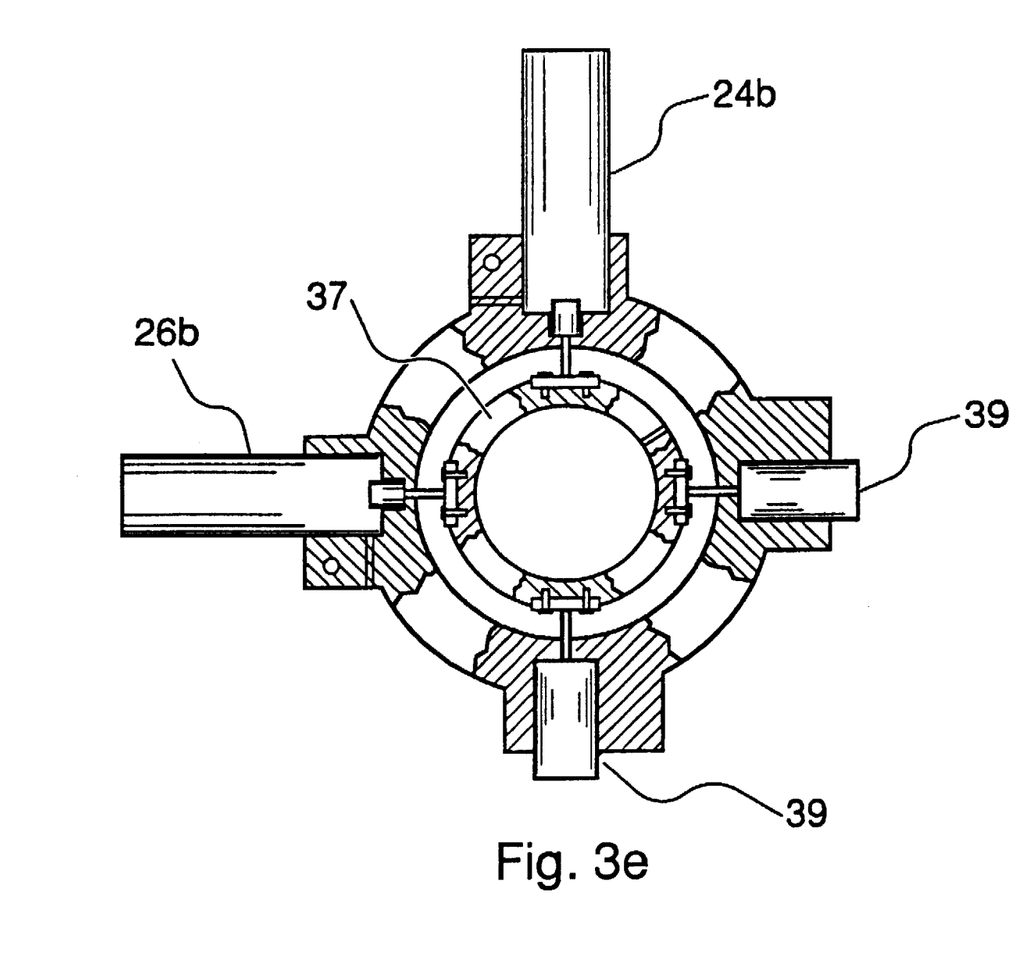

In FIG. 3e an embodiment of the invention is shown, where the spring joints 33a and 33b present in FIG. 3a, are replaced with pistons 39. Advantageously, the pistons provide longitudinal rigidity with none of the deleterious effects of the compression force induced by the spring joints of FIG. 3a.

In summary, the invention described heretofore, provides a method and system for microscanning that obviates the requirement set out in many prior art systems of moving the microscanning image sensor. As well, the method and device is well suited to being used in a microprocessor driven system wherein the number of steps in each axis per pixel pitch as well as the image frame rate can be dynamically changed using the same physical configuration.

Of course, numerous other embodiments may be envisaged, without departing from the spirit and scope of the present invention.

What we claim is:

1. A dithering system comprising:

a stationary frame;

a movable lens mounted within the stationary frame;

two thin members disposed such that their longitudinal axes are orthogonal to one another, the members being either in a rest position or operable in one of a longitudinally rigid mode and a laterally flexible mode, said members for normally securing and holding the lens within the stationary frame in a fixed position in the rest position, in the presence of a force upon one of the members, one of said members being operable in the longitudinally rigid mode while the other member is operable in the laterally flexible mode of operation so as to guide and force the lens to move along one of the orthogonal axes; and, means for applying the force.

2. A dithering system as defined in claim 1, wherein the means for applying the force comprises two piezoelectric actuators, each actuator disposed at an end of one of the two thin members, and including circuitry for controlling the actuators so that only one actuator is enabled at a time, the moveable lens moving in the direction of the force applied by the actuator.

3. A positioning device comprising:

a stationary frame;

an optical element mounted to and movable within the stationary frame, said movement being confined to a plane;

flexure means comprising a pair of flexure elements, each element being rigid enough along a longitudinal axis, so that when a force is applied to an end thereof along the longitudinal axis, the element does not significantly bend, yet each element being sufficiently laterally flexible, such that when a force is applied across the longitudinal axis of the element, the element flexes, whereby the flexure elements in an unflexed position are for securing and holding the optical element within the staionary frame in a fixed position, and for allowing the optical element to move along at least one axis that lies on the plane, in the presents of an applied force; and, means for applying the force.

4. A positioning device as defined in claim 3, wherein the optical element is fixedly mounted within a holder, the holder and optical element being moveable within the stationary frame.

5. A positioning device as defined in claim 4, where in the flexure means further comprises two flexible s-shaped members coupling the holder to the stationary frame.

6. A positioning device as defined in claim 5, wherein the means for moving the optical element along one axis along the plane comprises a piezo-electric transducer.

7. A positioning device as defined in claim 6, wherein at least one of the s-shaped members is flexed as the piezo-electric transducer applies a force to the optical element.

8. A positioning device as defined in claim 4, wherein the flexure elements are each positioned to move the optical element along a different axis on the plane, the axes being orthogonal, each of said flexure elements having a stiffness that will allow a force applied to an end of one element to force the optical element to move in a direction along the longitudinal axis of the flexure elements, while the other flexure element laterally flexes.

9. A positioning device as defined in claim 8, wherein the optical element is comprised of a lens and wherein the flexure elements are in the form of flat steel blades.

10. A dithering system for positioning an optical element in a plurality of positions along two orthogonal axes defining a plane comprising:

a stationary frame;

a holder secured to the optical element and mounted to the stationary frame; flexible joints for normally securing and holding the holder within the stationary frame in a fixed position and for allowing the holder holding the optical element to move friction-free along each of two orthogonal axes in the presence of force applied to the holder; and means for applying the force to the holder.

11. A dithering system as defined in claim 10, wherein the optical element is a lens and wherein the holder securely frames the lens.

* * * * *